PHASE AND D.-C. VOLTAGE ANALOG COMPUTING SYSTEM

Filed Oct. 19, 1962 4 Sheets-Sheet 1

INVENTOR.
Eddy Hose
BY [signature]

PHASE AND D.-C. VOLTAGE ANALOG COMPUTING SYSTEM

Filed Oct. 19, 1962 4 Sheets-Sheet 2

INVENTOR.

Eddy Hose

BY

INVENTOR.
Eddy Hose
BY

PHASE AND D.-C. VOLTAGE ANALOG COMPUTING SYSTEM

Filed Oct. 19, 1962 4 Sheets-Sheet 4

INVENTOR.
Eddy Hose
BY

United States Patent Office 3,294,961
Patented Dec. 27, 1966

3,294,961

PHASE AND D.-C. VOLTAGE ANALOG COMPUTING SYSTEM

Eddy Hose, Bethesda, Md., assignor to Cubic Corporation, San Diego, Calif., a corporation of California Filed Oct. 19, 1962, Ser. No. 231,770
6 Claims. (Cl. 235—193)

The present invention relates to a phase and D.-C. voltage analog computing system and, more particularly, to an analog computing system which accepts input information in either signal phase difference or D.-C. voltage form, performs various arithmetic computations on the input information in the same two forms, and produces output answer information in either form.

The most common type of analog computers accepts input information in D.-C. voltage form, performs all internal computations with D.-C. voltages, and produces output information in D.-C. voltage form. However, not all analog information required for computer input arises naturally in D.-C. voltage form and, in such cases, must first be converted to D.-C. signals before being acceptable for computer input. One particularly large class of information is that which occurs as the phase difference between a pair of A.-C. signals, generally termed data and reference signals. For example, resolvers produce information in this form, i.e. phase shifted A.-C. signals, as a function of their shaft displacement. Additionally, certain classes of C.W. tracking equipment produce output information representing slant ranges and direction cosines as phase differing signals. Also, conversion of other types of information into phase difference form is oftentimes readily accomplished. For example, binary numbers representing digital information may be converted into phase information by well-known digital counting techniques or, by the technique found in Patent No. 2,991,462, entitled Phase-to-Digital and Digital-to-Phase Conversion, dated July 4, 1961, to the inventor of the present application, Eddy Hose, and having a common assignee with the present application. Hence, the general analog computer requirement for D.-C. voltage inputs is not always directly met in actual practice owing to the large class of instrumentation which produces output phase rather than voltage information.

The present invention is concerned with a general analog computational scheme which accepts input information in both phase difference and D.-C. voltage level form and performs its various computational processes in the same two forms. Additionally, conversion between the two is likewise provided; hence, input information may appear in either form and, output information may be selectively presented in either form, as may be required for various output requirements.

One circuit which appears in all embodiments of the present invention is an analog multiplier circuit. In its simplest form, and it is this form that is employed in the computing system of the present invention, the multiplier unit produces an output D.-C. voltage level whose value corresponds to the product of the information contained in a pair of complementary "duty cycle" type of two-level A.-C. input signals and an input D.-C. signal. The specific information contained in the duty cycle signal is represented by the duration of one voltage level relative to the other during each cycle. It may also be noted that another multiplier circuit similar to the one herein shown, but representing an improvement thereover in terms of accuracy, is described and illustrated in a copending U.S. patent application having a common assignee with the present invention and entitled Phase and D.-C. Voltage Analog Multiplier, Ser. No. 230,841, filed Oct. 16, 1962, to E. S. Levy and E. Herzberg, may readily be employed in the system according to the present invention.

In brief, the simplified multiplier circuit, as herein illustrated, includes a direct signal path between the D.-C. input signal terminal and an output amplifier and filter combination. A diode bridge is operated on by one of the two-level input A.-C. signals and its complementary signal to ground the input terminal of the amplifier during the appearance of a high voltage level in the A.-C. signal with the result that no signal amplification of the input D.-C. signal takes place. On the other hand, the diode bridge is effectively disconnected from the amplifier input terminal during the appearance of a low voltage level in each cycle of the A.-C. signal with the result that the applied D.-C. signal is applied to and filtered by the final amplifier and filter combination. Hence, since the input D.-C. signal is linearly amplified for a length of time each cycle which corresponds to the low voltage level in the A.-C. input signal and is shorted out during the remaining portion of each cycle, the averaged D.-C. output signal produced by the amplifier and filter combination represents the product of the D.-C. voltage and the duty cycle of the A.-C. signal.

Division is accomplished between two D.-C. input signals essentially by using a multiplier circuit, of the type described, as the feedback element in a servo loop. In particular, the multiplier D.-C. output voltage is subtracted from one D.-C. input voltage, representing the dividend, and the resulting error signal employed to drive a voltage controlled oscillator or "VCO." The VCO output signal is applied, along with a reference A.-C. source, to the A.-C. signal input terminals of the multiplier. Additionally, the other or divisor input D.-C. voltage is applied to the D.-C. input terminal of the multiplier. Since, in the circuit connections described, the output phase information of the divider circuit is multiplied by the divisor, and the product subtracted from the dividend input signal, it is seen that, at null, that is, when the error signal applied to the VCO is zero, the phase information contained in the A.-C. output signals is the quotient of the two input signals.

D.-C. output voltages whose magnitude represents the sine or cosine function of an angle $\theta$, initially appearing as the phase difference between data and reference A.-C. signals, are readily generated in accordance with the present invention. In this application, the A.-C. reference signal is applied to the D.-C. voltage input terminal of the analog multiplier and the data A.-C. signal is initially converted to a square wave and it, with its inverted signal, applied to the pair of A.-C. input terminals of the multiplier.

Recalling the general operation of the multiplier, as described briefly above, the portion of the reference sine wave signal appearing concurrently during the half cycle or 180° segment of each cycle, when the data A.-C. signal is at its low voltage level, is passed to the output amplifier and filter combination and amplified and filtered thereby. Since this filtering operation is essentially an averaging process which produces a D.-C. voltage whose value corresponds to the area, i.e. integral, of the reference sine wave intersected by the data signal, it will be appreciated that the D.-C. output signal represents the cosine (integral of the sine), of the displacement angle.

As a final illustration of the computing system techniques according to the present invention, a system is shown which performs various computational functions including square root extraction, cosine generation, multiplication, division and conversion both ways between phase difference and D.-C. voltage levels. In particular, $x$, $y$, and $\theta$ input voltages are assumed and an output D.-C. signal generated which equals $\sqrt{x}\cos\theta/y$. The square root is generated by using a multiplier in a feedback loop between the output and one of the inputs of a divider circuit. Hence, since the input quantity, representing $x$, is divided by the output signal and equals the output signal at null, the output signal represents the square root of the input, or $\sqrt{x}$.

Next, the input voltage representing $\theta$ is converted into phase difference form by passing it into a divider along with a D.-C. reference signal scaled to represent a "1." The output of this divider is applied to a cosine function generator whose output D.-C. signal is then multiplied by the $\sqrt{x}$ is a multiplier circuit. The multiplier output signal is passed to another divider, along with the D.-C. voltage representing $y$, with the result that the divider's output signal constitutes the $\sqrt{x}$ cos $\theta/y$. The divider output signal is then modified from phase to D.-C. form by a multiplier which receives the D.-C. reference signal on its D.-C. input terminal.

It is, accordingly, the principal object of the present invention to provide an analog computing system which is capable of receiving input information in either phase difference or D.-C. level form, computing on such information using the same two forms and finally producing output information in the same two forms.

Another object of the present invention is to provide an analog computing system including computing units individually capable of receiving input information in various combinations of phase difference and D.-C. voltage form, performing various arithmetic operations including division, square root extraction, and trigonometric function generation on the input information, and producing output answer information in various combinations of phase difference and D.-C. signal form.

A further object of the present invention is to provide an analog computing system capable of receiving input information in either phase difference or D.-C. voltage form and selectively converting the information from phase difference to D.-C. voltage and from D.-C. voltage to phase difference form and performing various arithmetic operations on the information including multiplication, division, and square root extraction.

A still further object of the present invention is to provide an analog computing system having the capability of performing the operations of multiplication, division, trigonometric function generation, and square root extraction in which input information may appear in the form of D.-C. voltage and/or the phase difference between a pair of A.-C. signals and which produces output information in the same two forms.

Another object of the present invention is to provide a simplified analog multiplier circuit which produces an output D.-C. voltage corresponding to the product of the information contained in the duty cycle of an applied rectangular waveform signal and an applied D.-C. input voltage.

Still another object of the present invention is to provide an analog multiplier which normally passes an applied D.-C. signal to an output filter and amplifier but which acts to ground the input of the amplifier and filter combination during each high voltage level interval of an applied A.-C. signal having a rectangular waveform configuration, the averaged output signal from the output filter and amplifier corresponding to the product of the D.-C. signal and the ratio of the duration of the high to low voltage levels of the A.-C. signal.

A further object of the present invention is to provide an analog dividing unit which produces in response to an input pair of D.-C. signals an output quotient appearing in the form of the phase difference between a pair of output A.-C. signals in which one of the D.-C. input signals and the phase difference A.-C. output signals are applied to an analog multiplier circuit which produces an output D.-C. signal corresponding to the product of its applied input quantities and in which the multiplier D.-C. output signal is subtracted from the other divider D.-C. input signal with the resulting difference signal, in turn, controlling a controllable oscillator, the phase relationship of whose output signal with a reference A.-C. signal constitutes the divider's output quotient information.

Other objects, features and attendant advantages of the present invention will become more apparent to those skilled in the art as the following disclosure is set forth, including a detailed description of a preferred embodiment of the invention as illustrated in the accompanying sheets of drawings, in which.

Figure 1:
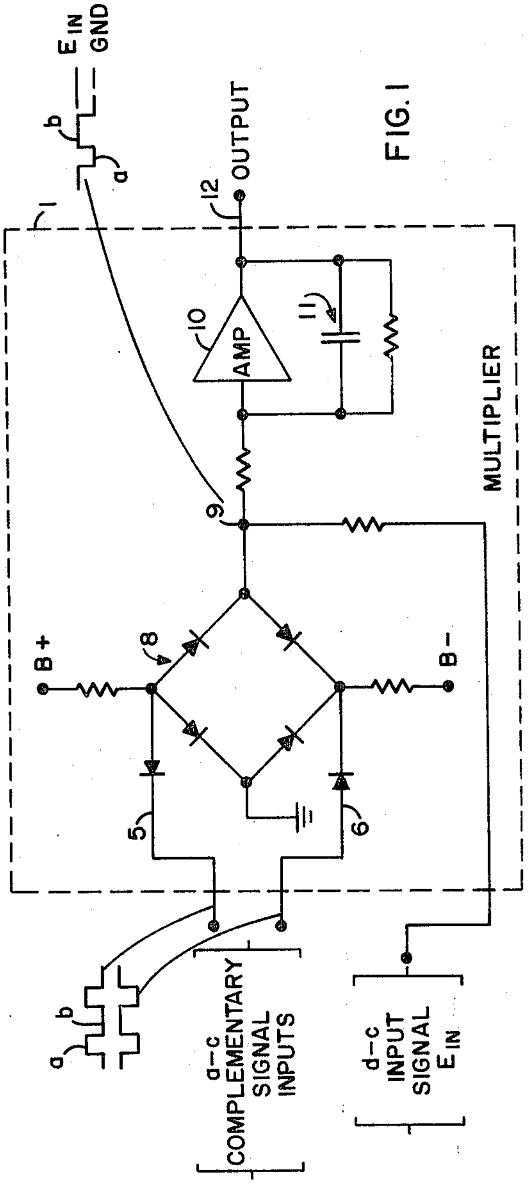
FIGURE 1 is a partly block diagrammatic and partly schematic representation of a simplified electronic analog multiplier circuit suitable for use in the various circuits according to the present invention.

Referring now to the drawings wherein the same elements are given identical numerical designations throughout the several figures, there is illustrated in FIGURE 1 a simplified analog electronic multiplier circuit for illustrating its general operation and input signal requirements prior to showing its use in the system according to the present invention. As noted previously, the multiplier circuit here shown is primarily for the purpose of example only as a more sophisticated, improved multiplier circuit is as shown in the co-pending patent application entitled Phase and D.-C. Voltage Analog Multiplier, Ser. No. 230,841 as noted earlier.

In this simplified multiplier, a pair of complementary A.-C. signal inputs are applied to a pair of input conductors 5 and 6 and from there through a respective pair of diodes to the input signal terminals of a diode switch, generally indicated at 8. These two input terminals are coupled through respective resistors, of suitable value, to the positive and negative terminals designated B+ and B−, respectively, of two sources of potential, not specifically indicated.

The D.-C. input signal to the multiplier is applied through a pair of resistors to the input terminal of an operational amplifier 10 having a resistance-capacitor filtering network 11 as a feedback network included between its output and input terminals. One of the output terminals of diode switch 8 is connected to ground while the other junction is coupled to the common connection 9 between the pair of series input resistors to amplifier 10. The output signal of the multiplier appears as the output signal of amplifier 10.

Considering now the operation of the multiplier 1, when the pair of complementary input signals applied to conductors 5 and 6 are at relatively high and low voltage levels, respectively, as is the case during the interval "*a*," indicated in the input pair of waveforms given by way of example, the pair of diodes in the input conductors are backbiased with the result that the current flow takes place through the switch 8 diodes from the B+ to the B− terminals. When this occurs, the output terminals connections will be at the same or at ground potential, with the result that the input terminal of amplifier 10 is grounded and no amplification of the applied D.-C. input signal produced, as is illustrated in the correspondingly designated interval in the waveform shown associated with junction 9. On the other hand, during the indicated interval "*b*," during which time the input signals on conductors 5 and 6 are at relatively low and high voltage levels, respectively, current flows from each of the B+ and B− terminals through their associated resistors, input diodes, and conductors with the result that the two output terminals of the diode bridge are isolated from each other. Under this operating condition, the bridge has no effect on the input terminal of amplifier 10 and the applied D.-C. input signal is amplified by amplifier 10.

The filter network 11 constitutes an averaging or smoothing device for the amplifier 10 output signal with the result that the output signal represents the averaged or smoothed values of the alternate conducting and non-conducting intervals of the amplifier which, in turn, corresponds to the relative durations of the designated "*a*" and "*b*" intervals in each cycle of the input signal. Inasmuch as the magnitude of the D.-C. signal passed during each conducting "*b*" interval corresponds to the magnitude of the applied input D.-C. signal, it is readily seen that the value of the D.-C. output signal corresponds to the product of the D.-C. input signal and the "duty cycle," i.e. relative durations of the high to low voltage levels in the A.-C. input signal applied to conductor 5.

Figure 2:
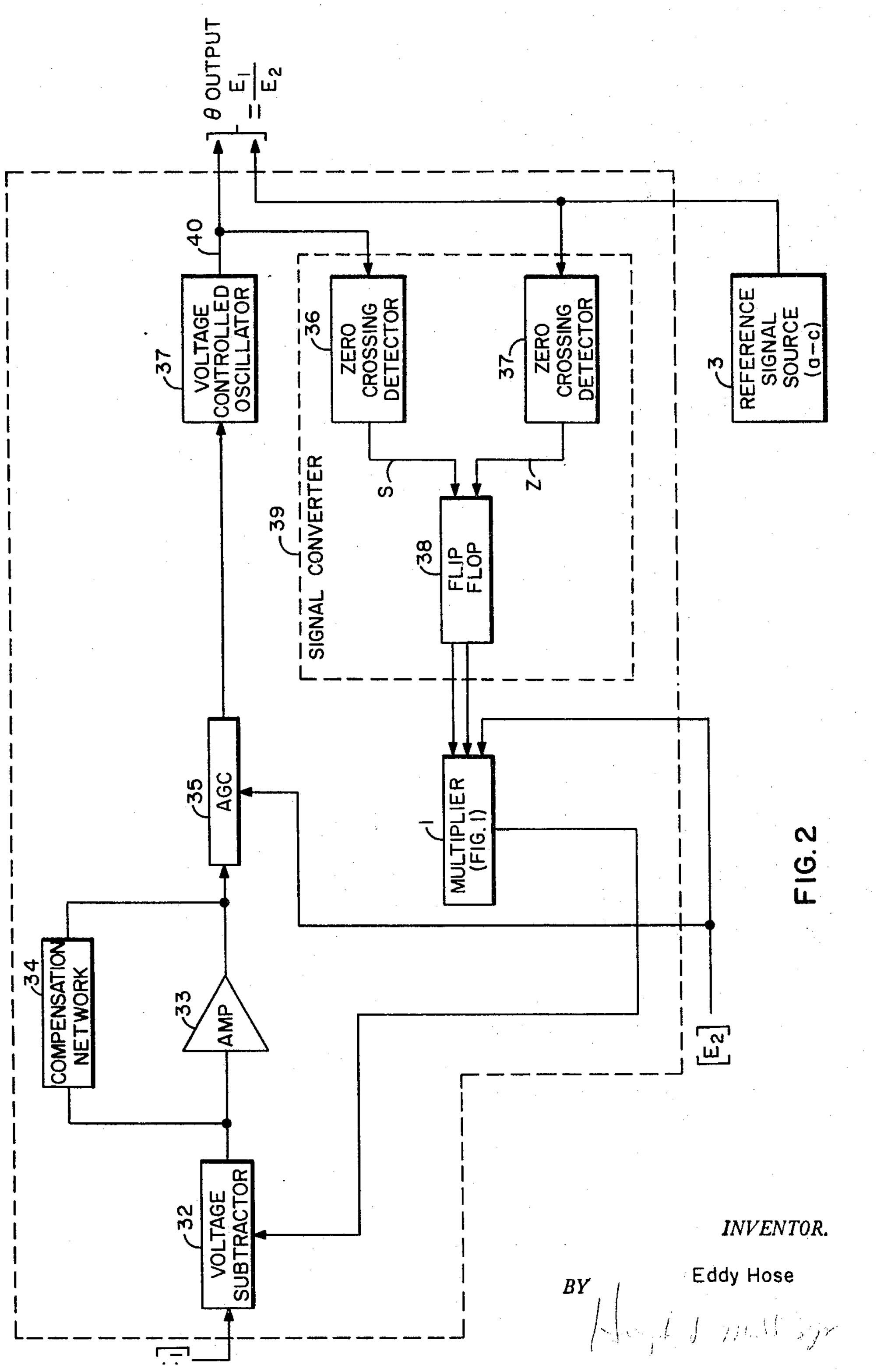
FIGURE 2 is a block diagrammatic representation of a divider circuit.

A divider circuit is illustrated in FIGURE 2. The two input signals whose magnitudes are to be divided, one by the other, are shown as $E_1$ and $E_2$. The signal $E_1$ is applied to one input terminal of a voltage subtractor circuit 32 whose output signal is applied to an amplifier 33, having a compensation network 34 connected between its output and input terminals. The output signal from amplifier 33 is passed through an automatic gain control or AGC circuit 35 to the input control terminal of a voltage controlled oscillator 37. In addition, the $E_2$ input signal is applied directly to the control terminal of AGC circuit 35. The phase difference between the output signal of voltage controlled oscillator 37 and the reference A.-C. signal produced by reference signal source 3 constitutes the output quotient, or $E_1/E_2$ of the divider circuit representing the phase difference angle.

The output signals produced by voltage controlled oscillator 37 and reference signal source 3 are passed through a pair of zero-crossing detectors 36 and 37, respectively, to the set and zero input terminals of a flip-flop 38, designated S and Z, respectively. The zero-crossing detectors 36 and 37 and flip-flop 38 constitute a signal converter 39 which serves to convert the phase difference information contained in a pair of A.-C. signals of identical frequency into the voltage level or duty cycle form, shown earlier in FIGURE 1, as required for operating the typical multiplier circuit therein illustrated. The complementary output signals produced by flip-flop 38 are applied to the pair of A.-C. or two-level input signal terminals of multiplier 1. The $E_2$ input signal, representing the other divider input D.-C. signal is applied to the D.-C. input terminal of multiplier 1. Finally, the output D.-C. signal of multiplier 1 is applied to the other input terminal of voltage subtractor 32.

The operation of the FIGURE 2 circuitry to accomplish the stated division may be readily shown. In particular, assume that the value represented by the phase difference between the two output signals, i.e. the quotient, is designated "*u*." Now, whenever the error signal to the voltage controlled oscillator 37 is zero, that is, the feedback voltage from multiplier 1 equals the input voltage $E_1$, the following relationship holds:

$$E_1-E_2\cdot u=0$$

Hence $$u=E_1/E_2$$

Stated differently, voltage controlled oscillator 37 is driven such that the phase difference between its output signal and the signal produced by reference signal source 3 when multiplied by $E_2$ equals the other input voltage $E_1$. Hence, the operation of division is accomplished.

AGC circuit 35 maintains the loop gain at a relatively constant value which would normally not be the case since the input variable $E_2$ is applied to the feedback loop and hence enters into its gain characteristics.

Figure 3:
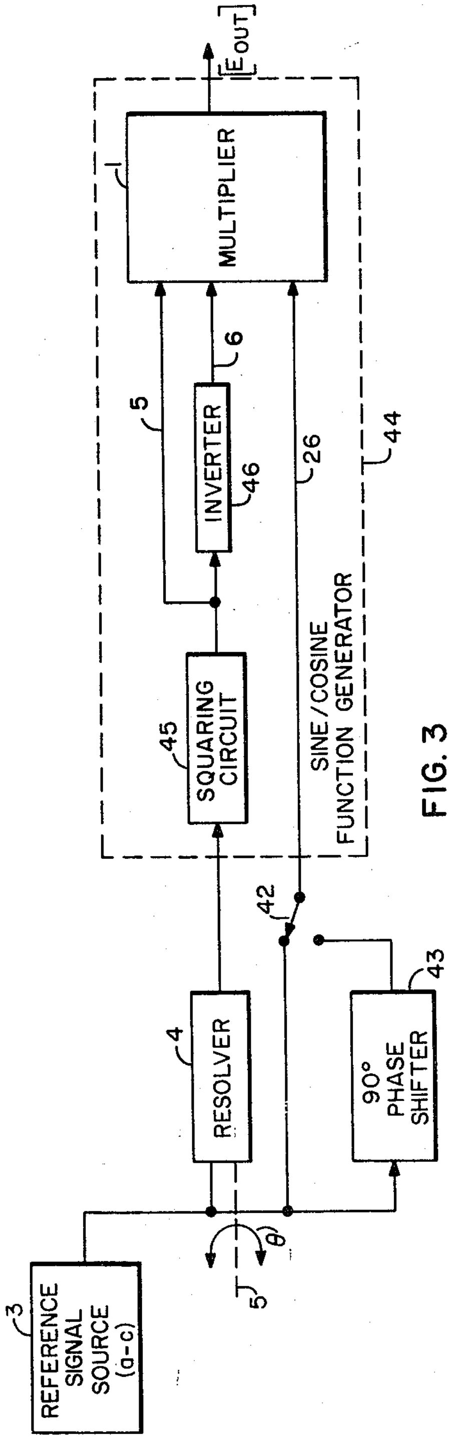
FIGURE 3 is a block diagrammatic representation of a sine/cosine function generator.

FIGURE 3 illustrates another aspect of the computing system according to the present invention in which an output D.-C. voltage is produced whose magnitude may be manually selected to represent either the sine or cosine function of an input phase angle $\theta$. In particular, the output signal of reference signal source 3 is applied through a resolver 4 whose shaft 5 is positioned at an angle $\theta$ corresponding to the sine or cosine function desired. In addition, the signal from source 3 is passed directly to the upper contact point of a single-pole double-throw switch 42 and additionally is passed through a 90° phase shifter 43 to the lower contact point of switch 42. The signal passing through resolver 4 is applied to a squaring circuit 45 within the sine/cosine function generator 44. The generator additionally includes a multiplier 1 which receives the output signal of squaring circuit 45 on its input conductor 5. In addition, the output signal of squaring circuit 45 is passed through an inverter 46 to the 6 input terminal of multiplier 1. Finally, the movable switch arm of switch 42 is coupled to the D.-C. voltage input conductor of multiplier 1 while the D.-C. output signal of the multiplier represents the output signal of the function generator.

Figure 4:
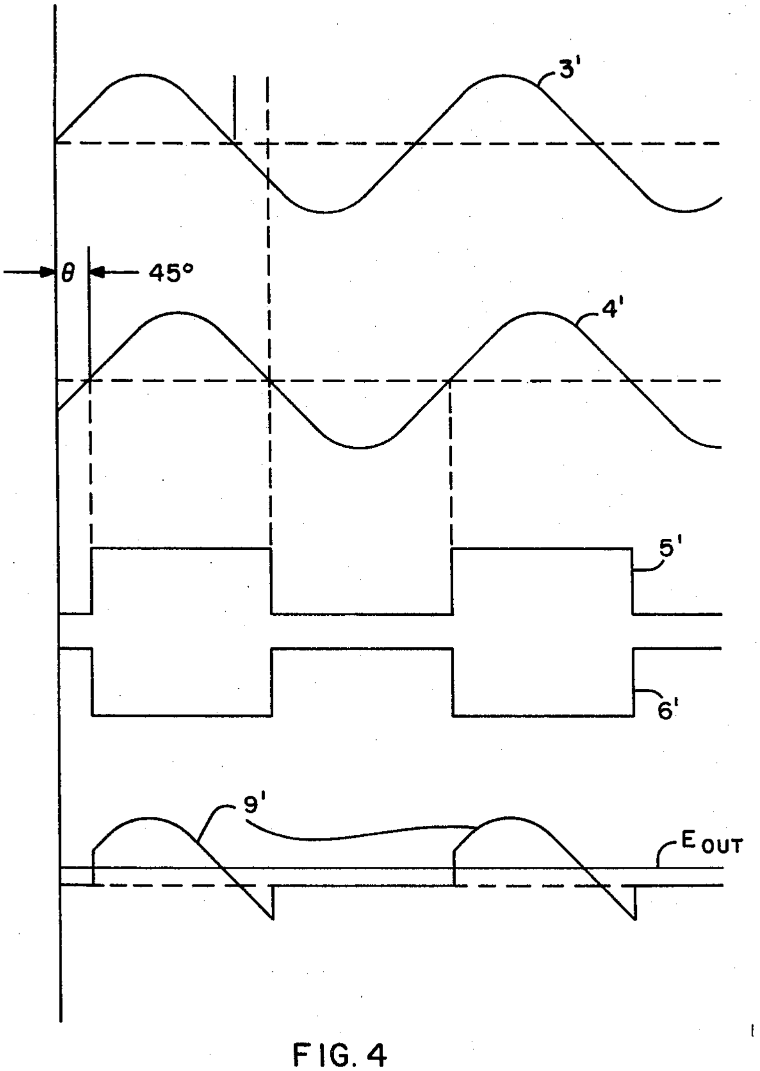
FIGURE 4 is a group of typical waveforms for illustrating the operation of the FIGURE 3 function generator.

The group of illustrative waveforms shown in FIGURE 4 serve to explain the operation of the sine/cosine function generator of FIGURE 3. In the figure, waveforms 3′ and 4′ represent the output signals coming from source 3 and resolver 4, respectively. The resolver shaft displacement is assumed, for the purposes of example, to be 45° with the result that signal 4′ lags signal 3′ by 45°. Since signal 4′ is squared and inverted, signals 5′ and 6′, which appear on the pair of multiplier input conductors 5 and 6, respectively, are complementary to each other and are exactly in phase with signal 4′.

Since the former D.-C. input signal to the multiplier is replaced by the reference sine wave 3′, signals 5′ and 6′ serve to gate sections, shown at 9′, of signal 3′ into the resistor network. In particular, as described previously, the relatively high voltage levels of signal 5′ serve to open diode bridge 8 in FIGURE 1 and permit the signal applied to the D.-C. input terminal to pass to the input terminal of amplifier 10 and accordingly be amplified and filtered to form the output signal. Waveform 9′ shows those sections of applied sine wave 3′ which are intersected or bracketed by the relatively high voltage level of signal 5′ and which are applied to the input terminal of amplifier 10. During the relatively low voltage level of signal 5′ the input to amplifier 10, as described previously, is grounded with no signal being applied, as a result, to the input terminal of amplifier 10. A line, designated $E_{out}$, is illustrated in the figure and represents the filtered or averaged value of signal 9′ as it appears at the output terminal of amplifier 10.

The value of $E_{out}$ corresponds to the averaged value of signal 9′, or its area, divided by the cycle duration or period. The area may be readily determined mathematically by integrating from $\theta$ to $(180°+\theta)$, and dividing by the period. As may be intuitively seen, since the integral of a sine curve is the cosine, the integration process will determine the cosine value of the indicated area. Hence, the integration process employed, i.e. the filtering by the filter and amplifier combination, results in a signal whose value corresponds to the cosine of the angle representing the phase shift between the initial reference and data signals.

In the example shown, if $\theta$ were 0°, then obviously the signal applied to the amplifier and filter input will be a series of half sinusoids whose integration or averaging would result in a value of "1," assuming proper scaling, which is, as is recognized, the value of the cosine of 0°. On the other hand, if $\theta$ equals 90°, then the portion of signal 3′ bracketed by the signal 5′ high voltage levels would result in equal positive and negative areas of the input signal 3′ being filtered which, in turn, averages out to a zero value, which, in turn, corresponds to the cosine of 90°.

It is also readily apparent that if signal 4' were given a permanent 90° leading phase shift, as by 90° phase shifter 43, then the sine of the angle $\theta$ would be generated as the value of the output signal since the integral of the cos $\theta$, which corresponds to sin $(\theta-90°)$, would be produced by the averaging process.

The operation of the FIGURE 3 circuitry for generating the sine function of the input phase difference is obtained by throwing switch 42 to its down contact position, 90° phase shifter 43 being assumed to produce a 90° leading phase shift of the applied signal. With this accomplished, it is readily seen by observation of the FIGURE 4 waveforms, signal 4' will lead signal 3' by 45° since signal 4' will be shifted left by 90°.

A predetermined relationship must be maintained between the amplitude of the A.-C. reference signal produced by source 3 and the D.-C. level scale to represent a maximum or "1" value. In particular, since the sine of 90° is "1," this value will be repersented by the D.-C. magnitude of the $E_{out}$ signal of the function generator whenever a 90° phase shift occurs between the reference and data signals. Since this D.-C. signal would be produced by filtering half sinusoids, i.e. 90° positive portions of the sine wave, it may be readily determined that the peak magnitude of the A.-C. reference voltage signal must be $\pi/2$ or 1.5708 times the D.-C. level taken to represent the value of "1."

The circuit, as described, essentially receives input phase difference information representing an input function. The D.-C. output signal, thus generated, is selectively the sine or the cosine of the input function and, so long as the input phase remains constant the output D.-C. level representing the sine or the cosine of the input phase difference will likewise remain constant. If, however, the input phase is varied cyclicly as a function of time, for example, its sine or cosine output function, previously considered as a D.-C. level, will also vary cyclicly with the result that a sine or cosine output waveform is produced. Hence, if angle $\theta$ in FIGURE 3 were given an angular velocity then a sine wave or cosine wave will be produced whose frequency corresponds to the shaft velocity. As will be apaprent, a number of other techniques exist by which an input frequency, rather than phase difference may be produced and a resulting sine or cosine output waveform produced.

Before proceeding with the remaining FIGURE 5, certain underlying principles involved in the computations performed by the apparatus of the present invention will be discussed. First of all, the techniques presented represent a generalized analog computational scheme in which all input and output information, may selectively appear either in the form of D.-C. voltage levels or in the phase difference between data and reference signals. In specific computations, the information must be in specified form as determined by each computational element involved. In order to illustrate the generality involved, reference is made to the Table I set forth below:

lines 3 and 4, i.e. where phase is converted to voltage and voltage converted to phase, employ the multiplier and divider units, respectively, along with reference D.-C. voltages to perform these indicated conversions. Since these phase-to-voltage and voltage-to-phase conversions are readily performed, any mixture of phase and voltage inputs to an analog computer according to the present invention may be employed since any one input may be converted to the opposite form as may be required for input to a specific computational unit.

For example, if two inputs require division, and both are in phase difference form, then their respective conversion to D.-C. voltage form, as is needed by a divider unit, may be readily accomplished by multiplier used as a converter as on line 3 of the table. In the same way, each output produced may be selectively in voltage or phase difference form as specifically required for its external use. Hence, the techniques of the present invention represent use very generalized and constitute an important contribution to the analog computational field, particularly, where phase difference information and/or D.-C. voltage information appears as input information and where either or both may be required as output information.

The sine/cosine generator of FIGURE 3, on line 5 of the table, receives phase difference information and produces a D.-C. output voltage. This phase difference input requirement is not restrictive since if an input D.-C. voltage representing an angle, for example, may still have its sine or cosine function generated. It must first be passed through a voltage-to-phase converter, of line 4, and the resulting reference and data phase difference signals be applied to the required input terminals of the sine/cosine generator.

The square root extractor, indicated on line 6, is shown detailed in the following FIGURE 5 and will be discussed in connection therewith. It also employs a divider and multiplier combination and produces a phase difference type of output in response to an input D.-C. voltage.

Figure 5:
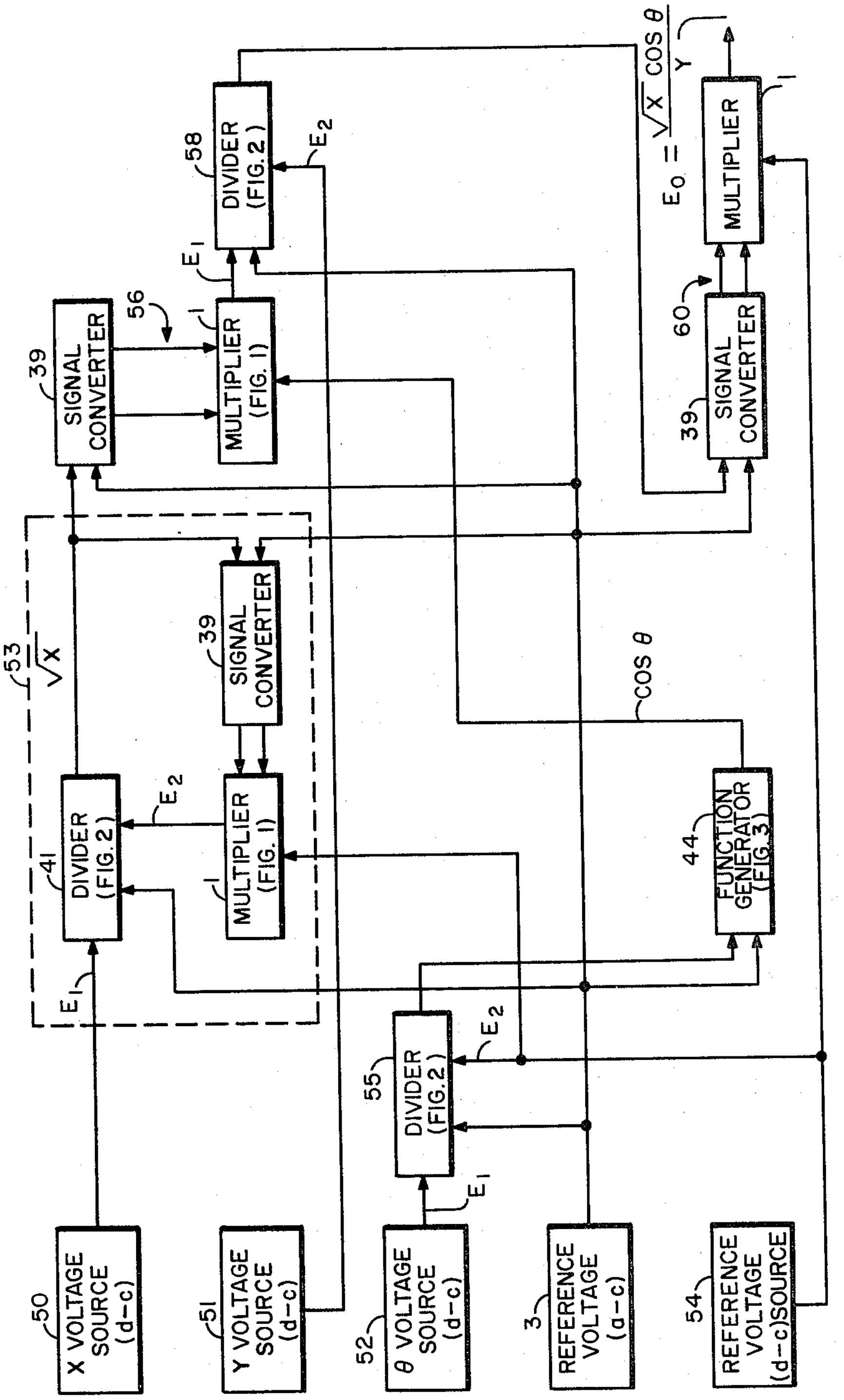
FIGURE 5 is a block diagrammatic representation of a typical computing system for further illustrating the techniques according to the present invention.

Referring now to FIGURE 5, there is illustrated a computational system employing the techniques of the present invention for the purposes of further explaining the combinational properties of the individual units. The system thus illustrated solves the following equation from assumed/inputs for $x$, $y$, and $\theta$:

$$\text{Output}=\sqrt{x}\ \text{cosine}\ \theta/y$$

For the purpose of this example, each of the $x$, $y$, and $\theta$ inputs are assumed to be in D.-C. voltage form coming from sources 50, 51, and 52, respectively, as generally indicated. The $x$ voltage is applied to a square root extractor 53, and, in particular, to the $E_1$ input terminal of a divider 41, within the extractor, the divider being similar to the one shown previously in FIGURE 2. The output signal from A.-C. reference voltage source 3 is likewise applied to divider 41 and the phase data output signal from the divider is applied to one input terminal of signal converter 39, in turn, connected to multiplier 1.

TABLE I

| Operation | 1st Input | 2d Input | Output |
|---|---|---|---|
| 1. Multiply | Phase Difference | D.-C. voltage | D.-C. voltage. |
| 2. Divide | D.-C. voltage | do | Phase Difference. |
| 3. Phase to voltage conversion (Multiplier). | Phase Difference | D.-C. reference voltage=1 | D.-C. voltage. |
| 4. D.-C. voltage to phase conversion (Divider). | D.-C. voltage | do | Phase Difference. |
| 5. Sine/Cosine generator | Data square wave | Reference sine/cosine wave | Voltage. |
| 6. Square root extractor (Divider and Multiplier). | D.-C. voltage | D.-C. reference voltage=1 and reference A.-C. voltage. | Phase Difference. |

The multiplier and divider of lines 1 and 2 have been shown in FIGURES 1 and 2, respectively, and described in connection therewith. The operations indicated on The reference signal is applied to the other input terminal of signal converter 39 while the output voltage of a D.-C. reference voltage source 54, whose magnitude represents "1," is applied to the D.-C. input voltage terminal of multiplier 1. The D.-C. output signal of multiplier 1 is applied to the $E_2$ input terminal of divider 41.

The phase output signal from divider 41, whose phase relationship with the reference signal constitutes $\sqrt{x}$, as will be explained shortly, and the phase reference signal are applied to another signal converter and multiplier combination, designated 56, similar to the one shown in FIGURE 1. The A.-C. and D.-C. reference signals from sources 3 and 54, respectively, and the D.-C. output signal from $\theta$ voltage source 52, the signal magnitude corresponding to $\theta$, are passed into a divider 55, similar to the one shown previously in FIGURE 2. The output signal of divider 55, along with the A.-C. reference signal are applied to a sine/cosine function generator 44, connected to produce a D.-C. output level corresponding to the cosine of the applied signal phase difference. The output signal of function generator 44 is applied to the D.-C. input voltage terminal of multiplier unit 56.

The output signal of multiplier unit 56 is applied to the $E_1$ terminal of another divider 58, similar to the one shown in FIGURE 4, while the $y$ output voltage produced by the $y$ voltage source 51 is applied to the $E_2$ input terminal of divider 58. Additionally, the A.-C. reference signal from reference voltage source 3 is applied to divider 58 and the divider's output signal is applied, along with the reference A.-C. signal, to the phase input terminals of a multiplier unit 60. The D.-C. reference voltage from reference voltage source 54 is applied to the D.-C. voltage input terminal of the multiplier. The output D.-C. voltage of the multiplier represents, as is indicated, $\sqrt{x}$ cosine $\theta/y$.

The only unit in FIGURE 5 requiring additional explanation is square root extractor 53. Assume that the output voltage is designated $u$. Multiplier 1 in the circuit is employed to convert the phase difference output of the divider to a D.-C. voltage in order that it may be compatible with the divider voltage input form requirements. Hence, the divider divides $E_1$, the input voltage, by $u$, the output voltage, or:

$$\frac{E_1}{u}=u$$

or $$u^2=E_1$$

and $$u=\sqrt{E_1}$$

Accordingly, since the $E_1$ is the voltage representing $x$, the output of the square root extractor equals $\sqrt{x}$.

Divider 55 serves to convert the input D.-C. voltage representing $\theta$ from voltage source 52 into output phase information as is required for input to a function generator, such as generator 44. The output D.-C. signal of function generator 44 is then applied directly to multiplier unit 56, which, in turn, multiplies it by the phase difference information coming from the square root extractor 53 to produce the partial result $\sqrt{x}\cos\theta$. Divider 58 then divides the $\sqrt{x}\cos\theta$ produced by multiplier unit 56 by $y$. Final multiplier unit 60 acts to convert the divider 58 output phase information into output D.-C. voltage form.

In the various embodiments shown, input phase difference information is generated by passing a reference signal through a resolver coupled to the shaft whose angular position corresponds to the input function. It will be apparent to those skilled in the art that numerous, other, well-known techniques may be employed which produce similar phase difference input information suitable for use with the computing technique herein established. Hence, the resolver technique shown is for purpose of example only and in no way is to be construed as a limitation of the present system. For example, binary numbers derived by computation, encoder pick-off, etc., may readily be converted into phase difference information in accordance with the techniques outlined in United States Patent No. 2,991,462 entitled Phase-to-Digital and Digital-to-Phase Converters, to Eddy Hose and dated July 4, 1961. Similarly, D.-C. voltages representing input information may appear or may be formed in a large variety of ways as will be readily apparent to those skilled in the art.

The phase difference output may be readily converted into digital form, if needed, by counting between consecutive zero-crossings of the reference and data signals. On the other hand, D.-C. output signals produced by the computer technique may be converted into binary numbers through the use of conventional analog-to-digital converters.

It will be appreciated by those skilled in the art that the specific circuit configurations and combinations shown represent only one of several variations capable of producing substantially the same results as herein described without involving invention. For example, the number and placements of the various D.-C. amplifiers, with their inverting or non-inverting properties, may be readily modified and still obtain the stated results without involving invention. It will also be appreciated that the various circuits, given in block diagrammatic form, may individually take many detailed embodiments as are known in the art and found in various textbooks, periodicals, etc., without involving invention.

Finally, it will be appreciated by those skilled in the art, that the foregoing description relates only to one detailed preferred embodiment of the present invention whose scope and spirit are set forth in the embodied claims.

What is claimed is:

1. In combination: first and second means for producing first and second signals, respectively, wherein the first signal produced by said first means is a first A.-C. signal; output filtering means responsive to an applied varying input signal for producing an output signal whose value represents the average of the applied input signal; conductive means normally coupling said first signal to said output filtering means; means responsive to the portion of said second signal lying above a predetermined magnitude for grounding said conducting means; means for generating a reference A.-C. signal, the phase difference between said reference and said first A.-C. signal corresponding to an angle, a trigonometric value of which is to be determined, means for squaring said reference A.-C. signal to produce said second signal, said squared signal exceeding said predetermined magnitude during one-half of each cycle whereby the averaged output signal produced by said output means represents a trigonometric value of the phase difference between said reference and said A.-C. signals.

2. An electronic unit for performing an arithmetic operation on the information represented by the phase difference between a pair of A.-C. input signals and a first D.-C. input voltage, said electronic unit comprising: averaging means responsive to the application of a varying input signal for producing an output signal representing the average thereof; means normally operable for coupling the first D.-C. input voltage to said averaging means but responsive when actuated for decoupling the D.-C. voltage from said averaging means; means responsive to the phase difference each cycle between the pair of A.-C. input signals for actuating said normally operable means; means for producing a second D.-C. voltage, means for producing an A.-C. reference signal, signal generating means producing an A.-C. signal whose frequency is a function of an applied error signal, the signals produced by the two last-named means constituting the pair of A.-C. input signals, voltage differencing means responsive to a pair of applied input D.-C. signals for producing an output voltage corresponding to the difference in the voltages thereof, means for applying the second D.-C. input signal and the output signal of said averaging means to said signal differencing means, and means for applying the output signal of said signal differencing means to said signal generating means as an applied error signal whereby the information represented by the phase difference between the A.-C. reference signal and the A.-C. signal generated by said signal generating means multiplied by the information represented by said first input D.-C. signal is equal to said second D.-C. input signal when said error signal is at a minimum, thus effecting a division operation between said second and first D.-C. signals, where the quotient is represented by the phase difference between the reference A.-C. signal and the A.-C. signal generated by said signal generating means.

3. An electronic analog divider adapted to be connected to an A.-C. reference signal source for producing output information representing the quotient of first and second input D.-C. signals, said divider comprising: signal generating means responsive to the value of an applied error signal for producing an A.-C. signal whose phase difference with respect to an applied A.-C. reference signal corresponds to the value of said error signal; analog multiplying means responsive to an input D.-C. signal and to the phase difference represented by a pair of applied A.-C. signals for producing an output D.-C. signal whose value corresponds to the product of the information represented by said applied D.-C. signal and the phase difference represented by said pair of applied A.-C. signals; means for applying the A.-C. signal produced by said signal generating means as a pair of complementary A.-C. signals and said second input D.-C. signal to said analog multiplying means; means for producing an output error signal corresponding to the difference between said first D.-C. signal and the output D.-C. signal of said multiplier means; and means for applying said output error signal to said signal generating means, whereby when said error signal is at a minimum, the phase difference between the pair of A.-C. signals produced by said signal generating means corresponds to the quotient of said first and second input D.-C. signals.

4. An analog computational unit for producing output information representing the quotient of the information contained in first and second input D.-C. signals, said analog unit comprising: analog multiplying means responsive to the information contained in the phase difference between a pair of applied A.-C. signals and a D.-C. input signal for producing a D.-C. output signal whose value represents the product thereof; first signal generating means for producing an A.-C. output signal representing a reference signal; second signal generating means responsive to an applied signal for producing an output A.-C. signal whose frequency corresponds to the value of said applied signal, the phase difference between said reference A.-C. signal and said output A.-C. signal being applied as the pair of A.-C. input signals to said multiplying means; means for applying the second input D.-C. signal as the D.-C. input signal to said multiplying means; means for producing a D.-C. error signal corresponding to the difference between said first input D.-C. signal and the output D.-C. signal produced by said multiplying means; and means for applying said D.-C. error signal to said signal generating means whereby said output A.-C. signal is driven to a phase relationship with said reference A.-C. signal such that the information represented thereby multiplied by said second input D.-C. signal corresponds to said first D.-C. input signal thereby making the information represented by said phase difference correspond to the quotient of said first and second D.-C. input signals.

5. An electronic analog computational unit responsive to an input D.-C. signal and an applied A.-C. reference signal for producing an A.-C. output signal whose phase difference with respect to the reference A.-C. signal corresponds to the square root of the applied input D.-C. signal, said computational unit comprising: analog dividing means responsive to first and second applied D.-C. signals for producing an output A.-C. signal whose phase difference with respect to a reference A.-C. signal corresponds to the quotient of said first and second applied D.-C. signals; means for applying said input D.-C. signal as a first applied signal to said analog dividing means; conversion means for converting the phase difference between said output A.-C. signal produced by said dividing means and the reference A.-C. signal into a D.-C. signal whose value corresponds to said phase difference; and means for applying the D.-C. signal produced by said conversion means as the second applied signal to said dividing means whereby the phase difference between the A.-C. signal produced by said dividing means and the reference A.-C. signal corresponds to the square root of said input D.-C. signal.

6. An electronic analog computational unit responsive to an input D.-C. signal and an applied A.-C. reference signal for producing an A.-C. output signal whose phase difference with respect to the reference A.-C. signal corresponds to the square root of the applied input D.-C. signal, said computational unit comprising: analog dividing means responsive to first and second applied D.-C. signals for producing an output A.-C. signal whose phase difference with respect to a reference A.-C. signal corresponds to the quotient of said first and second applied D.-C. signals; means for applying said input D.-C. signal as a first applied signal to said analog dividing means; conversion means for converting the phase difference between said output A.-C. signal produced by said dividing means and the reference A.-C. signal into a first D.-C. signal whose value corresponds to said phase difference, including an analog multiplying circuit responsive to the phase difference between a pair of applied A.-C. signals and an applied D.-C. signal for producing a second D.-C. signal whose value corresponds to the product of said input quantities; means for applying said first D.-C. signal produced by said conversion means as the second applied signal to said dividing means; said unit including, in addition, means for generating a reference D.-C. signal whose value is scaled to represent unity, and means for applying said reference D.-C. signal as the input D.-C. signal to said multiplier unit whereby the phase difference between said pair of input A.-C. signals is effectively multiplied by unity thereby forming an output D.-C. signal whose value corresponds to the phase difference between said pair of A.-C. signals.

References Cited by the Examiner

UNITED STATES PATENTS

| | | | |
|---|---|---|---|
| 2,773,641 | 12/1956 | Baum. | |
| 2,973,146 | 2/1961 | Schmid | 235—194 |
| 3,013,724 | 12/1961 | Thompson et al. | 235—194 |
| 3,028,487 | 4/1962 | Losee | 307—88.5 |
| 3,029,386 | 4/1962 | Ricker. | |
| 3,043,516 | 7/1962 | Abbott et al. | 235—193 XR |
| 3,064,144 | 11/1962 | Hardy | 307—88.5 |
| 3,104,319 | 9/1963 | Ericson | 235—193 |
| 3,141,969 | 7/1964 | Brendle | 235—193 |
| 3,154,749 | 10/1964 | Perkins | 235—183 XR |
| 3,180,976 | 4/1965 | Robinson | 235—183 XR |
| 3,217,151 | 11/1965 | Miller et al. | 235—193 XR |

MALCOM A. MORRISON, *Primary Examiner.*

I. KESCHNER, *Assistant Examiner.*